United States Patent
Kimpara

(10) Patent No.: US 10,495,119 B2
(45) Date of Patent: Dec. 3, 2019

(54) SPOOL VALVE

(71) Applicant: Nidec Tosok Corporation, Zama-shi, Kanagawa (JP)

(72) Inventor: Kunio Kimpara, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 0 days.

(21) Appl. No.: 15/924,545

(22) Filed: Mar. 19, 2018

(65) Prior Publication Data

US 2019/0093678 A1    Mar. 28, 2019

(30) Foreign Application Priority Data

Mar. 27, 2017 (JP) .................. 2017-061331

(51) Int. Cl.
*F15B 13/04* (2006.01)
*F16K 11/07* (2006.01)

(52) U.S. Cl.
CPC ...... *F15B 13/0407* (2013.01); *F15B 13/0402* (2013.01); *F16K 11/0708* (2013.01); *F15B 2211/3138* (2013.01); *F15B 2211/327* (2013.01); *Y10T 137/2526* (2015.04); *Y10T 137/2572* (2015.04)

(58) Field of Classification Search
CPC ............. F15B 13/0407; F15B 13/0402; F15B 2211/3138; F15B 2211/327; Y10T 137/2521; Y10T 137/2526; Y10T 137/2541; Y10T 137/2572
USPC ...................... 137/100, 101.11, 101.31, 114
See application file for complete search history.

(56) References Cited

U.S. PATENT DOCUMENTS

| 3,154,925 A | * | 11/1964 | De Vita | B30B 15/24 137/100 |
| 3,442,218 A | * | 5/1969 | Wess | F04B 49/007 137/565.13 |
| 3,561,327 A | * | 2/1971 | Stremple | B62D 5/07 137/100 |
| 3,752,176 A | * | 8/1973 | King | F01L 25/063 137/100 |
| 3,762,443 A | * | 10/1973 | Sorenson | F15B 13/04 137/625.27 |

(Continued)

FOREIGN PATENT DOCUMENTS

| JP | 10-252903 A | 9/1998 |
| JP | 2004-116685 A | 4/2004 |
| JP | 2016-070331 A | 5/2016 |

*Primary Examiner* — William M McCalister
(74) *Attorney, Agent, or Firm* — Keating & Bennett, LLP

(57) ABSTRACT

A spool valve includes a valve portion that opens and closes a portion between an input port and an output port and a radial-direction-position changing portion provided in an outer lateral surface of the valve portion in a radial direction. When a first value is equivalent to or larger than a threshold that is larger than 0, the portion between the input port and the output port are opened to permit a flow of the oil inside the first connection oil passage, and when the first value is smaller than the threshold, the portion is closed to block the flow of the oil inside the first connection oil passage. The radial-direction-position changing portion extends in the axial direction, and a position thereof in the radial direction changes inwardly from a first side towards a second side in the axial direction.

12 Claims, 5 Drawing Sheets

(56) References Cited

U.S. PATENT DOCUMENTS

| | | | | |
|---|---|---|---|---|
| 3,882,678 A * | 5/1975 | Fassbender | B62D 5/32 | 137/114 |
| 4,073,140 A * | 2/1978 | Lang | B62D 5/08 | 137/114 |
| 4,237,993 A * | 12/1980 | Jablonsky | B62D 5/32 | 180/406 |
| 4,306,840 A * | 12/1981 | Fassbender | B62D 5/08 | 137/118.07 |
| 4,369,805 A * | 1/1983 | Tavor | F16K 27/041 | 137/101.31 |
| 4,429,619 A * | 2/1984 | Leutner | F15B 11/0426 | 137/100 |
| 4,530,371 A * | 7/1985 | Arav | D21F 3/0218 | 137/115.13 |
| 4,541,450 A * | 9/1985 | Bron | A01C 23/042 | 137/101.31 |
| 4,607,486 A * | 8/1986 | Cole | F02C 7/236 | 417/203 |
| 4,667,930 A * | 5/1987 | Latimer | F15B 13/04 | 137/596.13 |
| 4,722,358 A * | 2/1988 | Christensen | A62C 5/02 | 137/101.11 |
| 4,862,920 A * | 9/1989 | Cleasby | F15B 13/04 | 137/625.3 |
| 4,941,508 A * | 7/1990 | Hennessy | F16K 11/0708 | 137/596.13 |
| 5,088,517 A * | 2/1992 | Bersch | B08B 9/032 | 137/101.11 |
| 5,682,744 A * | 11/1997 | Hasegawa | B62D 5/087 | 137/625.3 |
| 6,497,100 B2 * | 12/2002 | Blot-Carretero | F02C 7/232 | 60/734 |
| 6,583,525 B2 * | 6/2003 | Dyer | F15B 21/042 | 137/100 |
| 7,234,293 B2 * | 6/2007 | Yates | F02C 7/232 | 60/39.281 |
| 8,793,971 B2 * | 8/2014 | Dyer | F02C 7/232 | 137/114 |
| 9,222,418 B2 * | 12/2015 | Bader | F02C 7/236 | |
| 2017/0051836 A1 * | 2/2017 | Guarino | F16K 11/0708 | |
| 2019/0093678 A1 * | 3/2019 | Kimpara | F15B 13/0402 | |

* cited by examiner

SPOOL VALVE

CROSS REFERENCE TO RELATED APPLICATIONS

This application claims the benefit of priority to Japanese Patent Application No. 2017-061331 filed on Mar. 27, 2017. The entire contents of this application are hereby incorporated herein by reference.

BACKGROUND OF THE INVENTION

1. Field of the Invention

The present disclosure relates to a spool valve.

2. Description of the Related Art

A hydraulic circuit device is known that includes a regulator valve that controls and discharges a hydraulic pressure supplied from an oil pump.

For example, Japanese Unexamined Patent Application Publication No. 2016-70331 describes a hydraulic circuit device that is provided in a control valve body of an automatic transmission.

In a hydraulic circuit device, such as the one described above, there is a case in which a valve mechanism is provided in an oil passage through which the oil, the hydraulic pressure of which is controlled by a regulator valve, flows. The valve mechanism switches between an all discharged state in which the oil flowing from two oil supply sources are made to flow in the oil passage, and a half discharged state in which the oil from either one of the oil supply sources is made to flow in the oil passage. When the all discharged state and the half discharged state are switched with the valve mechanism, there is a case in which the hydraulic pressure of the oil inside the oil passage, in which the hydraulic pressure of the oil is controlled with the regulator valve, rapidly changes, and in which a chattering that is a vibration of the regulator valve occurs. Accordingly, there is a case in which the hydraulic pressure of the oil inside the oil passage cannot be controlled in a stable manner with the regulator valve.

SUMMARY OF THE INVENTION

An object of the present disclosure in view of the above situation is to provide a spool valve that can suppress chattering from occurring.

An aspect of a spool valve of the present disclosure in a hydraulic control including a first oil supply source that draws in oil and discharges the oil having a first oil flow characteristic, a second oil supply source that draws in the oil and discharges the oil that has a second oil flow characteristic, a first output side oil passage into which the oil discharged from the first oil supply source flows, the first output side oil passage supplying hydraulic pressure to a controlled object, a second output side oil passage into which the oil discharged from the second oil supply source flows, a first connection oil passage that connects the first output side oil passage and the second output side oil passage to each other, and a valve mechanism provided with a spool hole, the valve mechanism being provided in the first connection oil passage, the spool hole including an input port connected to the second output side oil passage and an output port connected to the first output side oil passage, the spool valve provided in the valve mechanism about a central axis that extends in an axial direction being movable inside the spool hole in the axial direction, the spool valve includes a valve portion that opens and closes a portion between the input port and the output port, and the valve portion including a radial-direction-position changing portion provided in an outer lateral surface of the valve portion in a radial direction. In the spool valve, in a case in which a first value is equivalent to or larger than a threshold, the threshold being larger than 0, the first value being a value obtained by subtracting a value of a first output hydraulic pressure inside a portion of the first output side oil passage to which the first connection oil passage is connected from a value of a second output hydraulic pressure inside a portion of the second output side oil passage to which the first connection oil passage is connected, the portion between the input port and the output port are opened to permit a flow of the oil inside the first connection oil passage from the second output side oil passage to the first output side oil passage, and in a case in which the first value is smaller than the threshold, the portion between the input port and the output port is closed to block the flow of the oil inside the first connection oil passage from the second output side oil passage to the first output side oil passage. The radial-direction-position changing portion extends in the axial direction, and a position thereof in the radial direction changes inwardly from a first side in the axial direction towards a second side in the axial direction.

The above and other elements, features, steps, characteristics and advantages of the present invention will become more apparent from the following detailed description of the preferred embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
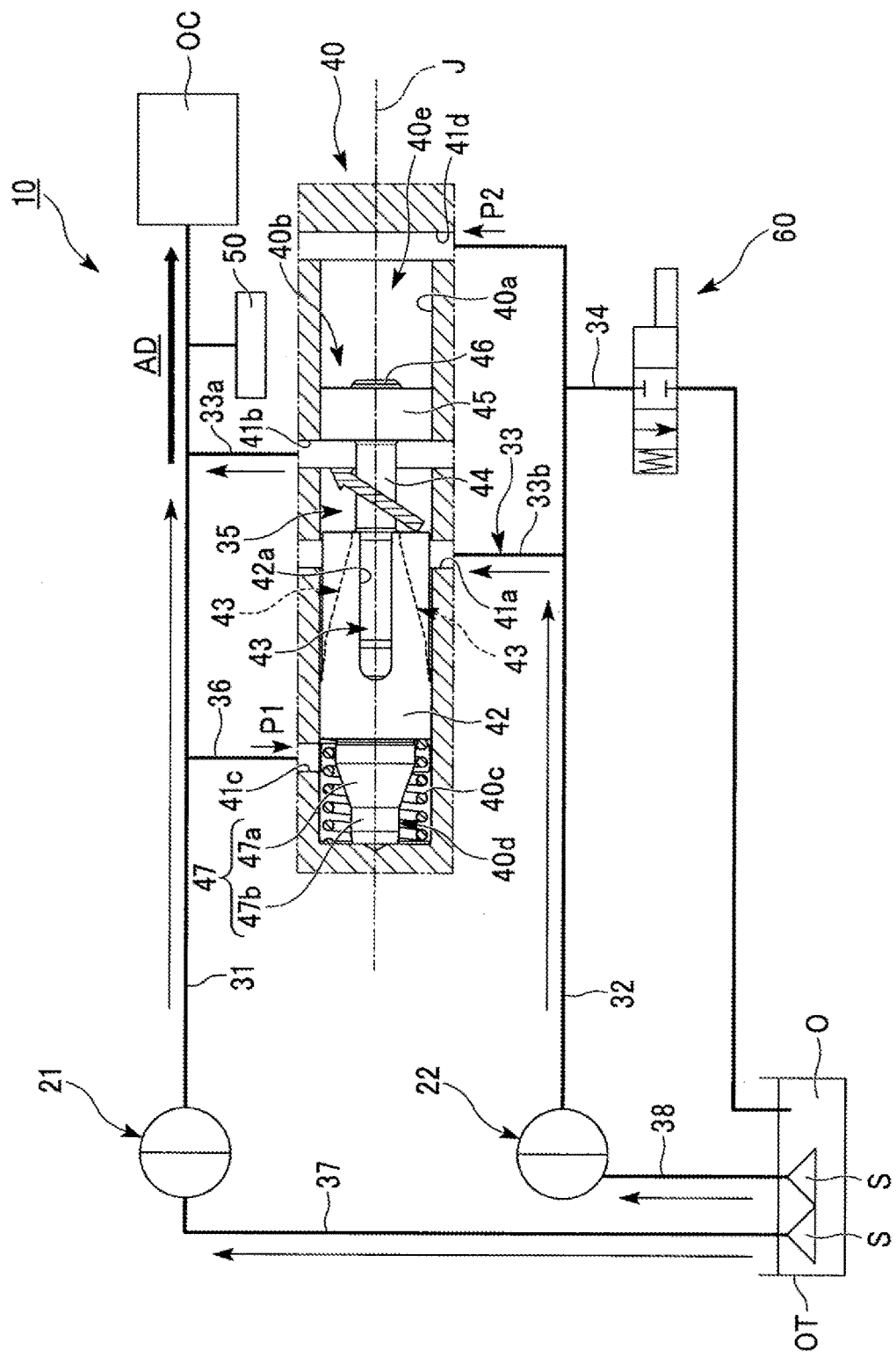
FIG. 1 is a diagram schematically illustrating a hydraulic control of the present exemplary embodiment.
Figure 2:
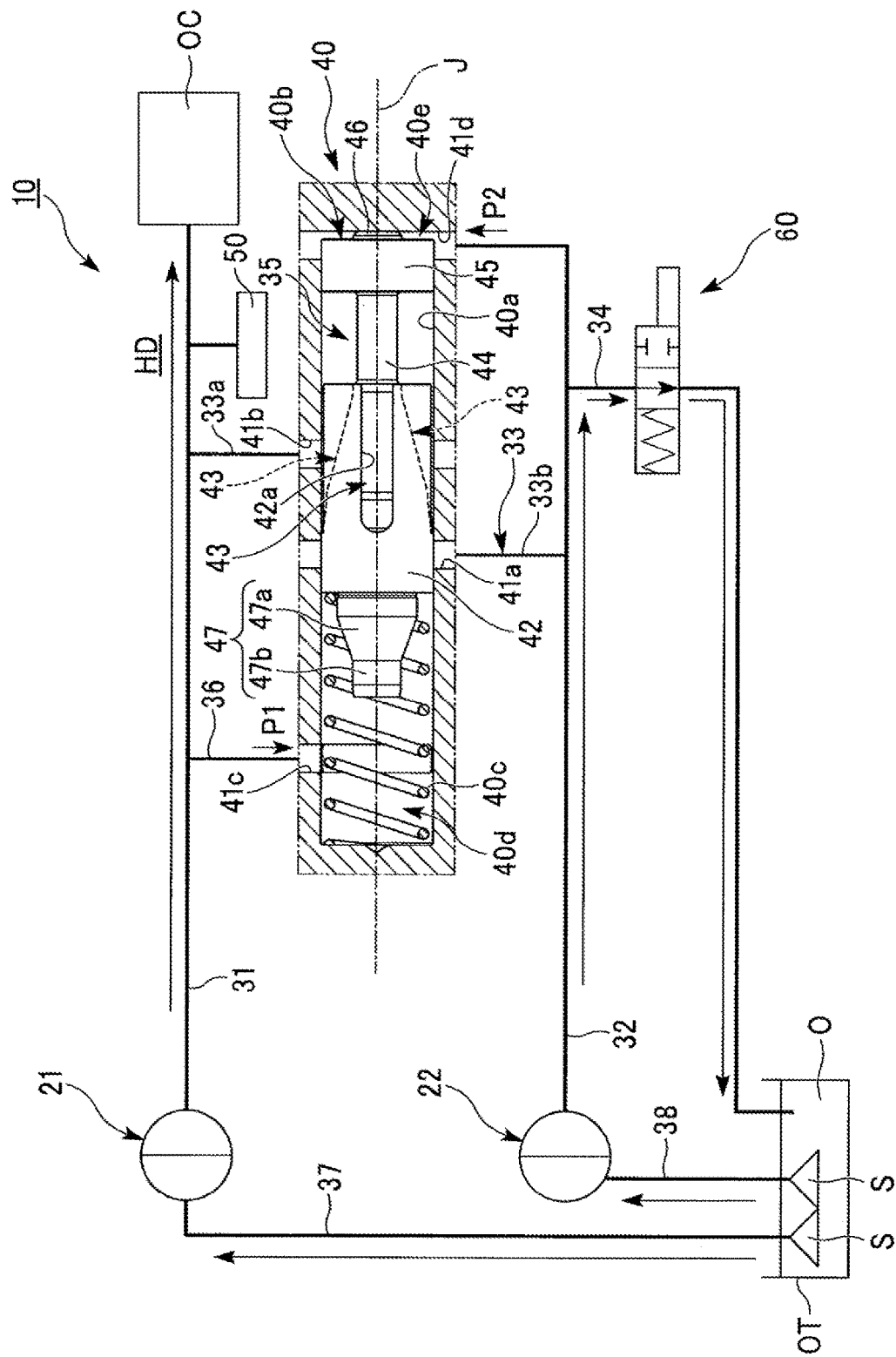
FIG. 2 is a diagram schematically illustrating the hydraulic control of the present exemplary embodiment.

A hydraulic control 10 of the present exemplary embodiment illustrated in FIGS. 1 and 2 controls a controlled object OC with hydraulic pressure. The hydraulic control 10 is mounted in a vehicle, for example. The controlled object OC is, for example, an automatic transmission of a vehicle. The hydraulic control 10 includes a first oil supply source 21, a second oil supply source 22, a first input side oil passage 37, a second input side oil passage 38, a first output side oil passage 31, a second output side oil passage 32, a first connection oil passage 33, a second connection oil passage 34, a branch oil passage 36, a pressure regulator 50, a solenoid valve 60, and a valve mechanism 40.

The first oil supply source 21 and the second oil supply source 22 are, for example, pumps that transmit oil O by being driven by an engine of a vehicle. The first oil supply source 21 draws in the oil O from an oil tank OT and discharges the oil O having a first oil flow characteristic. The second oil supply source 22 draws in the oil O from the oil tank OT and discharges the oil O having a second oil flow characteristic. A hydraulic pressure of the oil O having the second oil flow characteristic is larger than a hydraulic pressure of the oil O having the first oil flow characteristic.

The first input side oil passage 37 is an oil passage through which the oil O drawn into the first oil supply source 21 from the oil tank OT, in which the oil O is stored, passes. A strainer S disposed inside the oil O stored in the oil tank OT is connected to an end portion of the first input side oil passage 37 on the oil tank OT side. The second input side oil passage 38 is an oil passage through which the oil O drawn into the second oil supply source 22 from the oil tank OT, in which the oil O is stored, passes. A strainer S disposed inside the oil O stored in the oil tank OT is connected to an end portion of the second input side oil passage 38 on the oil tank OT side.

The first output side oil passage 31 is an oil passage into which the oil O discharged from the first oil supply source 21 flows. The first output side oil passage 31 connects the first oil supply source 21 and the controlled object OC to each other. The first output side oil passage 31 supplies hydraulic pressure of the oil O to the controlled object OC. The second output side oil passage 32 is an oil passage into which the oil O discharged from the second oil supply source 22 flows. The first connection oil passage 33 is an oil passage that connects the first output side oil passage 31 and the second output side oil passage 32 to each other. The second connection oil passage 34 is an oil passage that connects the second output side oil passage 32 and the oil tank OT to each other. The branch oil passage 36 is an oil passage that connects a portion of the first output side oil passage 31 on the first oil supply source 21 side with respect to the portion of the first output side oil passage 31 to which the first connection oil passage 33 is connected and the valve mechanism 40 to each other.

The pressure regulator 50 is connected to the first output side oil passage 31 at a portion that is on the controlled object OC side with respect to the portion to which the first connection oil passage 33 is connected. The pressure regulator 50 adjusts the hydraulic pressure of the oil O inside the first output side oil passage 31 to a predetermined pressure. The pressure regulator 50 is a regulator valve, for example.

The solenoid valve 60 is provided in the second connection oil passage 34. The oil O inside the second connection oil passage 34 is switched between a flow permitted state and a flow blocked state with the solenoid valve 60. FIG. 1 illustrates a state in which the flow of the oil O inside the second connection oil passage 34 is blocked by the solenoid valve 60. FIG. 2 illustrates a state in which the flow of the oil O inside the second connection oil passage 34 is permitted by the solenoid valve 60. The flow of the oil O inside the second connection oil passage 34 permitted by the solenoid valve 60 is a flow of the oil O flowing from the second output side oil passage 32 towards the oil tank OT.

The valve mechanism 40 is provided in the first connection oil passage 33. By providing the valve mechanism 40, the first connection oil passage 33 is divided into a first portion 33a and a second portion 33b. The first portion 33a is an oil passage that connects the first output side oil passage 31 and the valve mechanism 40 to each other. The second portion 33b is an oil passage that connects the second output side oil passage 32 and the valve mechanism 40 to each other. The valve mechanism 40 includes a spool hole 40a, a spool valve 40b provided about a central axis J extending in an axial direction, and an elastic member 40c.

In the present exemplary embodiment, the central axis J extends in the left-right direction in FIGS. 1 and 2. In the description hereinafter, a direction parallel to the axial direction of the central axis J will merely be referred to as an "axial direction". Furthermore, the left side in FIGS. 1 and 2 in the axial direction will merely be referred to as a "left side", and the right side in FIGS. 1 and 2 in the axial direction will merely be referred to as a "right side". The left side is equivalent to a first side in the axial direction, and the right side is equivalent to a second side in the axial direction. Note that the left side and the right side are merely terms for describing the positional relationship of the members, and the actual dispositional relationship and the like may be a dispositional relationship and the like that is different from the dispositional relationship and the like that is depicted by the above terms.

The spool hole 40a extends in the axial direction about the central axis J. Two ends of the spool hole 40a on both sides in the axial direction are closed. A cross-sectional shape of the spool hole 40a orthogonal to the axial direction of the spool hole 40a is round. The spool hole 40a includes, in an inner surface thereof in the radial direction, an input port 41a, an output port 41b, a first connection port 41c, and a second connection port 41d.

The input port 41a is connected to the second output side oil passage 32 through the second portion 33b. With the above, the oil O from the second portion 33b flows into the spool hole 40a through the input port 41a. The output port 41b is connected to the first output side oil passage 31 through the first portion 33a. With the above, the oil O inside the spool hole 40a flows out to the first portion 33a through the output port 41b. The input port 41a is disposed on the left side with respect to the output port 41b. The input port 41a and the output port 41b each have an annular shape provided in the whole circumference in the circumferential direction. The size of the input port 41a in the axial direction and the size of the output port 41b in the axial direction are smaller than a size of a radial-direction-position changing portion 43 (described later) in the axial direction.

The first connection port 41c is disposed on the left side with respect to the input port 41a. The first connection port 41c is open in a first gap 40d between a left side of a valve portion 42 described later and an end surface of the spool hole 40a on the left side. The branch oil passage 36 is connected to the first connection port 41c. With the above, the oil O inside the first output side oil passage 31 flows into the first gap 40d through the branch oil passage 36 and the first connection port 41c. The first connection port 41c has an annular shape provided in the whole circumference in the circumferential direction.

The second connection port 41d is disposed on an end portion of the spool hole 40a on the right side. The second connection port 41d is open in a second gap 40e between an end surface of a sliding portion 45 (described later) on the right side and an end surface of the spool hole 40a on the right side. An end portion of the second output side oil passage 32 on the side that is opposite the second oil supply source 22 is connected to the second connection port 41d. With the above, the oil O inside the second output side oil passage 32 flows into the second gap 40e through the second connection port 41d.

Figure 3:
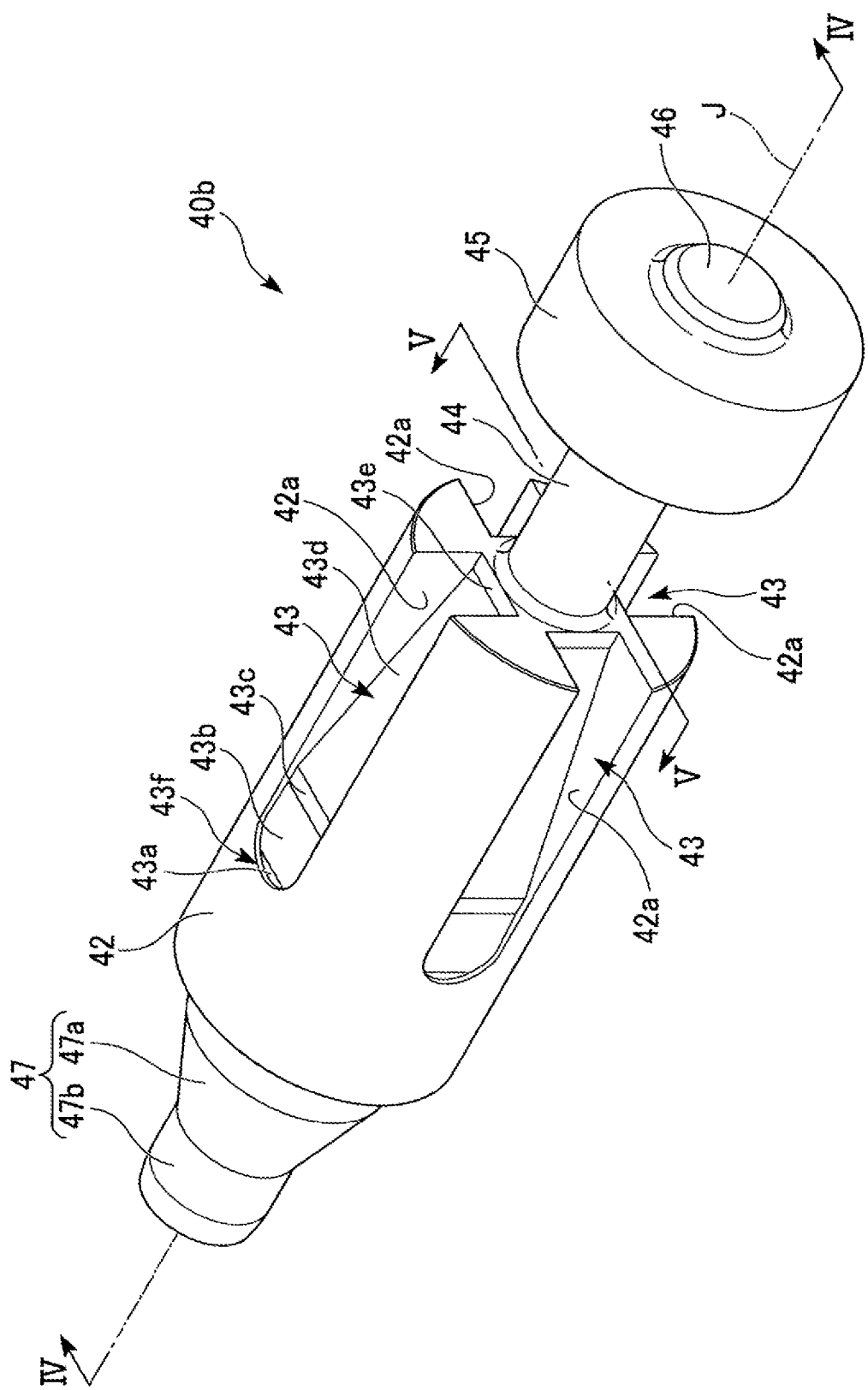
FIG. 3 is a perspective view illustrating a spool valve of the present exemplary embodiment.

The spool valve 40b can move inside the spool hole 40a in the axial direction. As illustrated in FIG. 3, the spool valve 40b has a multistage cylindrical shape that extends in the axial direction. The spool valve 40b includes, in order from the left side to the right side, a first support portion 47, the valve portion 42, an oil passage constituting portion 44, the sliding portion 45, and a second support portion 46.

The first support portion 47 includes a tapered portion 47a in which an outside diameter thereof becomes smaller from the right side towards the left side, and a tip portion 47b connected to an end portion of the tapered portion 47a on the left side. The tip portion 47b is an end portion of the spool valve 40b on the left side. As illustrated in FIG. 1, an end surface of the tip portion 47b on the left side can be in contact with the end surface of the spool hole 40a on the left side. An outside diameter of the first support portion 47 is smaller than an inside diameter of the spool hole 40a.

The valve portion 42 is connected to an end portion of the first support portion 47 on the right side. The valve portion includes radial-direction-position changing portions 43 provided in an outer lateral surface of the valve portion 42 in the radial direction. Each radial-direction-position changing portion 43 extends in the axial direction and the position thereof in the radial direction changes inwardly in the radial direction from the left side towards the right side. Each radial-direction-position changing portion 43 extends to an end portion of the valve portion 42 on the right side. With the above, each end portion of the radial-direction-position changing portion 43 on the right side is connected to a connection oil passage 35. In the present exemplary embodiment, each radial-direction-position changing portion 43 is provided in a portion of the valve portion 42 in the circumferential direction. Accordingly, by providing the radial-direction-position changing portions 43, portions of the valve portion 42 in the circumferential direction are depressed inwardly in the radial direction. Furthermore, as described above, the radial-direction-position changing portions 43 extend in the axial direction. Accordingly, in the present exemplary embodiment, by providing the radial-direction-position changing portions 43, grooves 42a that are depressed inwardly in the radial direction and that extend in the axial direction are provided in the outer lateral surface of the valve portion 42 in the radial direction. A size of each groove 42a in the radial direction increases from the left side towards the right side. An inside of each groove 42a is a gap formed in the radial direction defined by the corresponding radial-direction-position changing portion 43 and the inner surface of the spool hole 40a in the radial direction.

Figure 4:
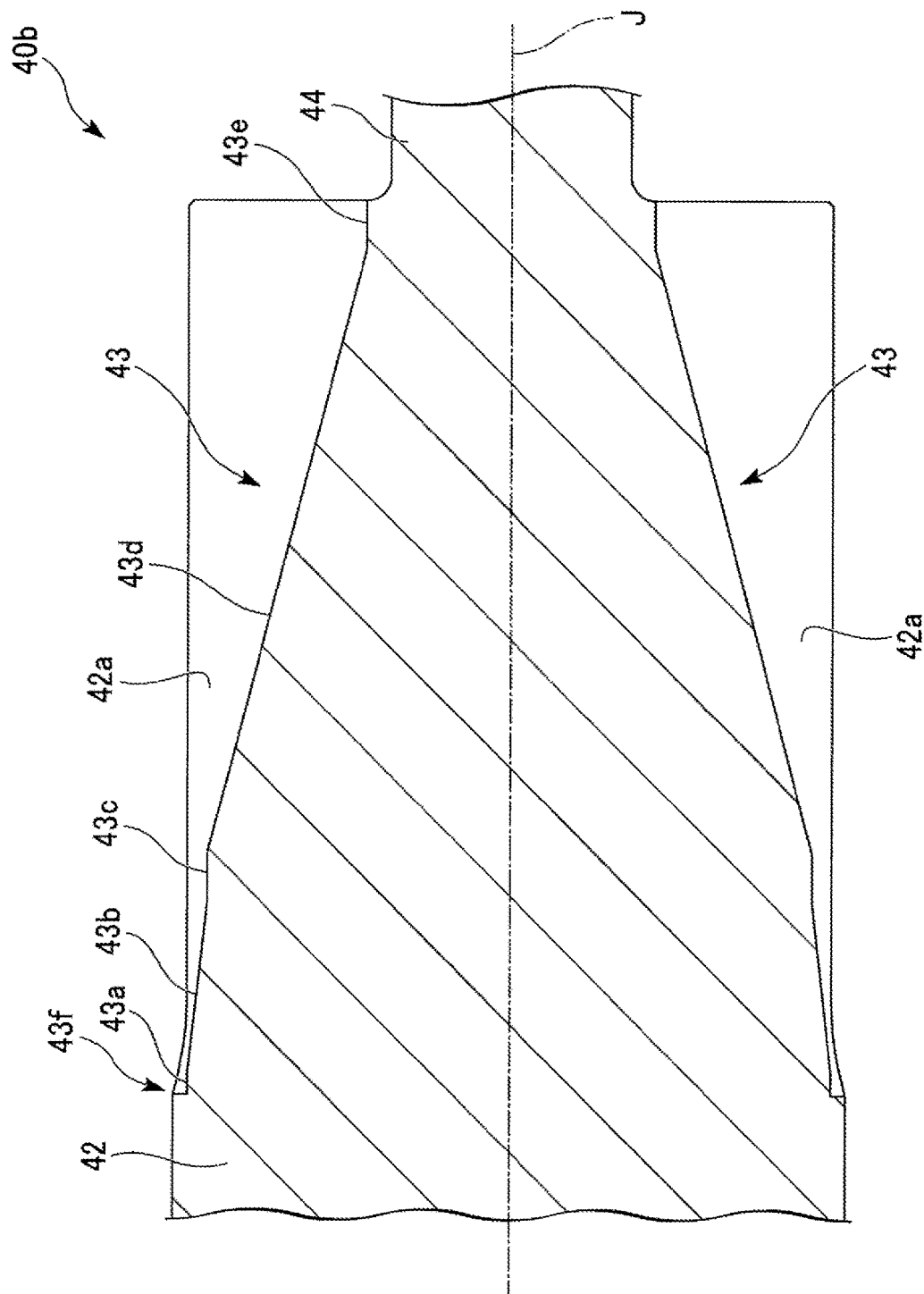
FIG. 4 is a diagram illustrating a portion of the spool valve of the present exemplary embodiment, and is a cross-sectional view taken along line IV-IV in FIG. 3.
Figure 5:
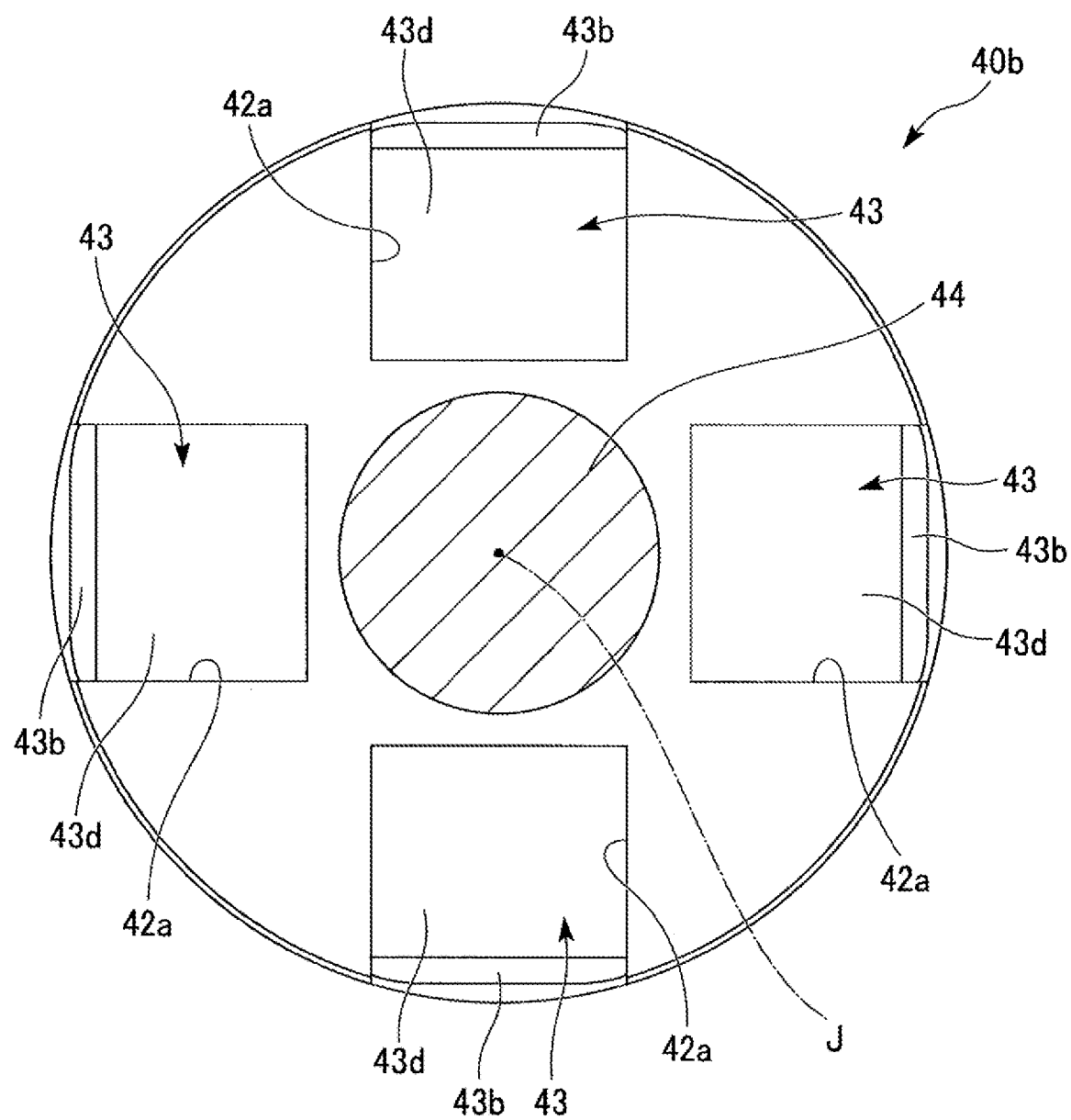
FIG. 5 is a diagram illustrating the spool valve of the present exemplary embodiment, and is a cross-sectional view taken along line V-V in FIG. 3.

As illustrated in FIGS. 3 to 5, a plurality of radial-direction-position changing portions 43 are provided in the circumferential direction. With the above, a plurality of grooves 42a are provided in the circumferential direction in the outer lateral surface of the valve portion 42 in the radial direction. The plurality of radial-direction-position changing portions 43 are disposed at equal intervals in the circumferential direction. The number of radial-direction-position changing portions 43 is not limited to a particular number, and the number is, for example, four, in the present embodiment. A detailed shape of the radial-direction-position changing portion 43 will be described later.

As illustrated in FIGS. 1 and 2, an outside diameter of the valve portion 42 in portions of the valve portion 42 other than the radial-direction-position changing portions 43 is substantially the same as the inside diameter of the spool hole 40a. The portions of the valve portion 42 other than the radial-direction-position changing portions 43 slide against the inner surface of the spool hole 40a in the radial direction when the spool valve 40b moves in the axial direction.

The oil passage constituting portion 44 is connected to the end portion of the valve portion 42 on the right side. An outside diameter of the oil passage constituting portion 44 is smaller than the outside diameter of the valve portion 42 and the outside diameter of the first support portion 47. As illustrated in FIG. 3, an outer lateral surface of the oil passage constituting portion 44 in the radial direction is positioned on the inner side in the radial direction with respect to the end portions of the radial-direction-position changing portions 43 on the right side. The outside diameter of the oil passage constituting portion 44 is uniform in the axial direction, for example. As illustrated in FIG. 1, the oil passage constituting portion 44 forms, in the radial direction and together with the inner surface of the spool hole 40a in the radial direction, the connection oil passage 35 that connects the input port 41a and the output port 41b to each other. The connection oil passage 35 has an annular shape that surrounds the outer side of the oil passage constituting portion 44 in the radial direction. Note that FIG. 1 illustrates a state in which the connection oil passage 35 connects the input port 41a and the output port 41b to each other. FIG. 2 illustrates a state in which the connection oil passage 35 does not connect the input port 41a and the output port 41b to each other.

The sliding portion 45 is connected to an end portion of the oil passage constituting portion 44 on the right side. An outside diameter of the sliding portion 45 is substantially the same as the inside diameter of the spool hole 40a. The sliding portion 45 slides against the inner surface of the spool hole 40a in the radial direction when the spool valve 40b moves in the axial direction. The second support portion 46 is connected to an end portion of the sliding portion 45 on the right side. The second support portion 46 is an end portion of the spool valve 40b on the right side. An outside diameter of the second support portion 46 is smaller than the outside diameter of the sliding portion 45. As illustrated in FIG. 3, the second support portion 46 has a flat and cylindrical shape. As illustrated in FIG. 2, an end surface of the second support portion 46 on the right side can be in contact with the end surface of the spool hole 40a on the right side.

The elastic member 40c is disposed in the spool hole 40a at a position that is on the left side with respect to the valve portion 42, in other words, the elastic member 40c is disposed in the first gap 40d. The elastic member 40c pushes the spool valve 40b from the left side towards the right side. The elastic member 40c is a compression coil spring that extends in the axial direction about the central axis J. An end portion of the elastic member 40c on the left side is supported by the end surface of the spool hole 40a on the left side. An end portion of the elastic member 40c on the right side is supported by an end surface of the valve portion 42 on the left side. The first support portion 47 is inserted in the end portion of the elastic member 40c on the right side. The elastic member 40c applies a rightward force to the spool valve 40b.

The spool valve 40b moves in the axial direction in accordance with the balance between a force that is a sum of a rightward force applied by a first output hydraulic pressure P1 of the oil O inside the first output side oil passage 31 that flows from the branch oil passage 36 to the first gap 40d and the rightward force of the elastic member 40c, and a leftward force applied by a second output hydraulic pressure P2 of the oil O inside the second output side oil passage 32 that flows from the second output side oil passage 32 to the second gap 40e. By having the spool valve 40b move in the axial direction, the valve portion 42 moves in the axial direction and the portion between the input port 41a and the output port 41b is closed or opened.

A state in which the valve portion 42 opens the portion between the input port 41a and the output port 41b is an open state in which, as illustrated in FIG. 1, the first portion 33a and the second portion 33b are connected through the connection oil passage 35 and in which the flow of oil O in the first connection oil passage 33 from the second output side oil passage 32 to the first output side oil passage 31 is permitted. A state in which the valve portion 42 closes the portion between the input port 41a and the output port 41b is a closed state in which, as illustrated in FIG. 2, the input port 41a is closed by the valve portion 42 and the first portion 33a and the second portion 33b are disconnected from each other and in which the flow of oil O in the first connection oil passage 33 from the second output side oil passage 32 to the first output side oil passage 31 is blocked. As described above, the state of the valve mechanism 40 changes between the open state and the closed state in accordance with the movement of the spool valve 40b in the axial direction.

Specifically, in the open state illustrated in FIG. 1, for example, when the second output hydraulic pressure P2 becomes small, the leftward force applied to the spool valve 40b becomes smaller than the rightward force applied to the spool valve 40b, and the spool valve 40b moves to the right. When the spool valve 40b moves to the right, the elastic force of the elastic member 40c becomes small and, accordingly, the rightward force applied to the spool valve 40b becomes small. The spool valve 40b moves to the right until reaching a position where the rightward force becoming smaller as the spool valve 40b moves towards the right side and the leftward force of the second output hydraulic pressure P2 that has become smaller balance each other.

In the case in which the second output hydraulic pressure P2 becomes small, when a first value that is a value obtained by subtracting a value of the first output hydraulic pressure P1 from a value of the second output hydraulic pressure P2 becomes smaller than a threshold, the valve portion 42 moves towards the right to a position illustrated in FIG. 2 and closes the input port 41a so that the valve mechanism 40 is in a closed state. In other words, in a case in which the first value is smaller than the threshold, the valve portion 42 closes the portion between the input port 41a and the output port 41b and blocks the flow of the oil O in the first connection oil passage 33 between the second output side oil passage 32 and the first output side oil passage 31.

Conversely, in the closed state, when the second output hydraulic pressure P2 becomes large and the first value becomes equivalent to or larger than the threshold, the valve portion 42 moves to the left with respect to the position illustrated in FIG. 2, and a portion of the input port 41a opposes one of the radial-direction-position changing portions 43 in the radial direction. With the above, the input port 41a and the output port 41b becomes connected through a gap in the radial direction between the radial-direction-position changing portion 43 and the inner surface of the spool hole 40a in the radial direction, in other words, the input port 41a and the output port 41b becomes connected through the corresponding groove 42a, and the valve mechanism 40 is switched to the open state. In other words, in a case in which the first value is equivalent to or larger than the threshold, the valve portion 42 opens the portion between the input port 41a and the output port 41b and permits the flow of the oil O in the first connection oil passage 33 between the second output side oil passage 32 and the first output side oil passage 31. The threshold is larger than 0. In other words, in the case in which the valve mechanism 40 is in the open state, the second output hydraulic pressure P2 is larger than the first output hydraulic pressure P1. With the above, the valve mechanism 40 is switched to the open state and the oil O flows into the first output side oil passage 31 from the second output side oil passage 32 through the first connection oil passage 33. In the case in which the valve mechanism 40 is in the open state, the threshold is equivalent to or smaller than the value of the rightward elastic force applied to the spool valve 40b with the elastic member 40c.

The change in the second output hydraulic pressure P2 occurs when the second connection oil passage 34 is opened or closed by the solenoid valve 60. In other words, when the second connection oil passage 34 is switched from a closed state illustrated in FIG. 1 to an open state illustrated in FIG. 2 with the solenoid valve 60, the oil O inside the second output side oil passage 32 flows to the oil tank OT through the second connection oil passage 34 and the hydraulic pressure of the oil O inside the second output side oil passage 32 is decreased. With the above, the second output hydraulic pressure P2 is decreased. The degree in which the second output hydraulic pressure P2 is decreased becomes larger as the opening degree of the second connection oil passage 34 becomes larger. Accordingly, by controlling the value of the electric current supplied to the solenoid valve 60, the opening degree of the second connection oil passage 34 can be controlled and the second output hydraulic pressure P2 can be controlled. With the above, the valve mechanism 40 can be switched between the open state and the closed state with the solenoid valve 60.

In the case in which the valve mechanism 40 is in the open state, as illustrated in FIG. 1, since the oil O inside the second output side oil passage 32 merges with the oil O in the first output side oil passage 31 through the first connection oil passage 33, the hydraulic control 10 is in an all discharged state AD in which the oil O discharged from the first oil supply source 21 and the oil O discharged from the second oil supply source 22 are supplied to the controlled object OC.

Conversely, in the case in which the valve mechanism 40 is in the closed state, as illustrated in FIG. 2, the oil O inside the second output side oil passage 32 does not merge with the oil O inside the first output side oil passage 31, and the oil O inside the second output side oil passage 32 flows into the oil tank OT through the second connection oil passage 34. Accordingly, the hydraulic control 10 is in a half discharged state HD in which only the oil O that has been discharged from the first oil supply source 21 is supplied to the controlled object OC.

As described above, in the present embodiment, since the open state and the closed state of the valve mechanism 40 can be switched with the solenoid valve 60, the state of the hydraulic control 10 can be switched between the all discharged state AD and the half discharged state HD with the solenoid valve 60.

When the state of the hydraulic control 10 is switched from the all discharged state AD to the half discharged state HD, since the flow rate of the oil O flowing inside the first output side oil passage 31 decreases rapidly, the hydraulic pressure of the oil O inside the first output side oil passage 31 easily decreases rapidly. Accordingly, the pressure regulator 50, for example, rapidly moves the valve body inside the pressure regulator 50 to increase the hydraulic pressure of the oil O inside the first output side oil passage 31. In the above, since the hydraulic pressure is changed rapidly, the hydraulic pressure of the oil O inside the first output side oil passage 31 easily increases above the target value adjusted by the pressure regulator 50.

Furthermore, the pressure regulator 50 rapidly moves the valve body once more to reduce the excessively increased hydraulic pressure. There are cases due to the above in which the hydraulic pressure of the oil O inside the first output side oil passage 31 is decreased below the target value once more.

As described above, when the state of the hydraulic control 10 is switched from the all discharged state AD to the half discharged state HD, there are cases in which a chattering, which is a vibration caused by the valve body of the pressure regulator 50 moving alternately in directions that increase and decrease the hydraulic pressure of the oil O inside the first output side oil passage 31, occurs. When a chattering occurs, since an increase and a decrease of the hydraulic pressure of the oil O inside the first output side oil passage 31 repeatedly occur and the hydraulic pressure becomes unstable, the supply of the hydraulic pressure to the controlled object OC becomes unstable.

Conversely, in the present exemplary embodiment, since the radial-direction-position changing portions 43 in which the positions thereof from the left side toward the right side changes inwardly in the radial direction are provided, the change in the flow rate of the oil O inside the first output side oil passage 31 can be made smaller when the valve mechanism 40 is switched between the open state and the closed state. Specifically, in a case in which the valve mechanism 40 is switched from the closed state to the open state, the state of the input port 41a closed by the valve portion 42 changes to a state in which the input port 41a opposes one of the end portion of the radial-direction-position changing portions 43 on the left side. Since the position of the end portion of the radial-direction-position changing portion 43 on the left side in the radial direction is relatively positioned on the outside in the radial direction, the gap in the radial direction between the end portion of the radial-direction-position changing portion 43 on the left side and the inner surface of the spool hole 40a in the radial direction is relatively small. Accordingly, the flow rate of the oil O flowing into the spool hole 40a from the input port 41a through the end portion of the radial-direction-position changing portion 43 on the left side is relatively small. With the above, the amount of increase in the flow rate of the oil O flowing from the input port 41a to the output port 41b immediately after the switching of the valve portion 42 to the open state can be made small, and the change in the flow rate of the oil O inside the first output side oil passage 31 can be made small.

Furthermore, since the position of the radial-direction-position changing portion 43 in the radial direction changes inwardly in the radial direction from the left side towards the right side, the position of the radial-direction-position changing portion 43 in the radial direction where the input port 41a opposes changes to an inward position in the radial direction as the valve portion 42 moves to the right side. With the above, the gap formed in the radial direction between each radial-direction-position changing portion 43 and the inner surface of the spool hole 40a in the radial direction becomes gradually larger. In other words, in the present embodiment, the size of each groove 42a in the radial direction becomes larger. Accordingly, the flow rate of the oil O flowing from the input port 41a to the output port 41b through the groove 42a can be increased gradually, and the flow rate inside the first output side oil passage 31 can be increased gradually. The state of the hydraulic control 10 can be switched from the half discharged state HD to the all discharged state AD while a rapid change in the flow rate of the oil O inside the first output side oil passage 31 is suppressed in the above manner.

Conversely, the position of the radial-direction-position changing portion 43 in the radial direction where the input port 41a opposes changes to an outward position in the radial direction as the valve portion 42 moves to the left side. With the above, in the present embodiment, the size of the groove 42a in the radial direction becomes smaller. Accordingly, the flow rate of the oil O flowing from the input port 41a to the output port 41b through the groove 42a can be decreased gradually, and the flow rate of the oil O inside the first output side oil passage 31 can be decreased gradually.

Furthermore, when the valve mechanism 40 is switched from the open state to the closed state, the state of the input port 41a changes from a state in which the input port 41a opposes the end portion of the radial-direction-position changing portion 43 on the left side to a state in which the input port 41a is closed by the valve portion 42. As described above, in the state in which the input port 41a opposes the end portion of the radial-direction-position changing portion 43 on the left side, the flow rate of the oil O flowing from the input port 41a to the output port 41b is small. Accordingly, even when the valve mechanism 40 is switched to the closed state and there is no oil O flowing from the input port 41a to the first output side oil passage 31, the amount of decrease in the flow rate of the oil O inside the first output side oil passage 31 can be made small. The state of the hydraulic control 10 can be switched from the all discharged state AD to the half discharged state HD while a rapid change in the flow rate of the oil O inside the first output side oil passage 31 is suppressed in the above manner.

As described above, in the present exemplary embodiment, since a rapid change in the flow rate of the oil O inside the first output side oil passage 31 can be suppressed while switching between the half discharged state HD and the all discharged state AD, a rapid change in the hydraulic pressure of the oil O inside the first output side oil passage 31 can be suppressed. With the above, the spool valve 40b that can suppress chattering from occurring is obtained.

In the present embodiment, the oil passage constituting portion 44 connected to the end portion of the valve portion 42 on the right side constitutes the connection oil passage 35; accordingly, the oil O flowing from the input port 41a to the groove 42a can be made to easily flow into the connection oil passage 35 by connecting the end portions of the radial-direction-position changing portions 43 on the right side to the connection oil passage 35. With the above, the oil O can be made to readily flow into the spool hole 40a from the input port 41a through the radial-direction-position changing portion 43.

Furthermore, in the present embodiment, the outer lateral surface of the oil passage constituting portion 44 in the radial direction is positioned on the inner side in the radial direction with respect to the end portions of the radial-direction-position changing portions 43 on the right side. Accordingly, the oil O flowing along the radial-direction-position changing portion 43 can be prevented from being obstructed at a connection between the radial-direction-position changing portion 43 and the oil passage constituting portion 44. With the above, the oil O flowing along the radial-direction-position changing portion 43 can flow smoothly into the connection oil passage 35. Accordingly, the oil O can be made to flow in a further readily manner into the spool hole 40a from the input port 41a through the radial-direction-position changing portion 43.

As illustrated in FIGS. 1 and 2, each radial-direction-position changing portions 43 extends in a straight manner in the axial direction. Accordingly, manufacturing of the radial-direction-position changing portions 43 is facilitated. In the present exemplary embodiment, the radial-direction-position changing portions 43 can be made by making the grooves 42a in the outer lateral surface of the valve portion 42 in the radial direction. Furthermore, the oil O flowing into the spool hole 40a from the input port 41a through the radial-direction-position changing portion 43 can flow easily along the radial-direction-position changing portion 43.

As illustrated in FIG. 4, each radial-direction-position changing portion 43 includes, continuously from the left side towards the right side in the following order, a first flat portion 43a, a first inclination portion 43b, a second flat portion 43c, a second inclination portion 43d, and a third flat portion 43e. The first flat portion 43a, the second flat portion 43c, and the third flat portion 43e are portions that are parallel to the axial direction. Outer lateral surfaces of the first flat portion 43a, the second flat portion 43c, and the third flat portion 43e in the radial direction are flat surfaces that are orthogonal to the radial direction.

The first flat portion 43a is the end portion of the radial-direction-position changing portion 43 on the left side. The third flat portion 43e is the end portion of the radial-direction-position changing portion 43 on the right side. A size of the first flat portion 43a in the axial direction is smaller than a size of the second flat portion 43c in the axial direction and a size of the third flat portion 43e in the axial direction. A size of the second flat portion 43c in the axial direction and a size of the third flat portion 43e in the axial direction are substantially the same. The second flat portion 43c is positioned on the inner side in the radial direction with respect to the first flat portion 43a. The third flat portion 43e is positioned on the inner side in the radial direction with respect to the second flat portion 43c. The first flat portion 43a is the portion in the radial-direction-position changing portion 43 that is positioned on the outermost side in the radial direction. The third flat portion 43e is the portion in the radial-direction-position changing portion 43 that is positioned on the innermost side in the radial direction.

The first inclination portion 43b connects the first flat portion 43a and the second flat portion 43c to each other. The first inclination portion 43b, from the left side towards the right side, inclines towards the inner side in the radial direction. Accordingly, in the first inclination portion 43b, the gap formed in the radial direction between the radial-direction-position changing portion 43 and the inner surface of the spool hole 40a in the radial direction becomes gradually larger from the left side towards the right side. With the above, with a relative movement in the axial direction while in a state in which the input port 41a and the first inclination portion 43b oppose each other, the change in the flow rate of the oil O flowing from the input port 41a into the groove 42a can be made smooth. Accordingly, a rapid change in the flow rate inside the first output side oil passage 31 can be suppressed further, and an occurrence of chattering can be suppressed further. An outer lateral surface of the first inclination portion 43b in the radial direction is a flat inclined surface positioned more on the inner side in the radial direction as the first inclination portion 43b extends from the left side towards the right side. A size of the first inclination portion 43b in the axial direction is larger than the size of each flat portion in the axial direction.

The second inclination portion 43d connects the second flat portion 43c and the third flat portion 43e to each other.

The second inclination portion 43d, from the left side towards the right side, inclines towards the inner side in the radial direction. An outer lateral surface of the second inclination portion 43d in the radial direction is a flat inclined surface positioned more on the inner side in the radial direction as the second inclination portion 43d extends from the left side towards the right side. The second inclination portion 43d is disposed on the right side with respect to the first inclination portion 43b. A size of the second inclination portion 43d in the axial direction is larger than the size of the first inclination portion 43b in the axial direction. An inclination of the second inclination portion 43d against the axial direction is larger than an inclination of the first inclination portion 43b against the axial direction. Accordingly, compared with a case in which the input port 41a and the first inclination portion 43b opposing each other are relatively moved in the axial direction, the degree of change in the flow rate of the oil O that flows into the groove 42a can be made larger in a case in which the input port 41a and the second inclination portion 43d opposing each other are relatively moved in the axial direction.

With the above, immediately after the valve mechanism 40 has been switched from the closed state to the open state, the flow rate of the oil O inside the first output side oil passage 31 can be increased in a relatively slow manner with the first inclination portion 43b, and after a short while after the valve mechanism 40 had been switched from the closed state to the open state, the flow rate of the oil O inside the first output side oil passage 31 can be increased in a relatively fast manner with the second inclination portion 43d. Since the change in the hydraulic pressure inside the first output side oil passage 31 stabilizes easily shortly after the valve mechanism 40 has been switched from the closed state to the open state, chattering does not easily occur even when the flow rate of the oil O inside the first output side oil passage 31 is increased relatively early.

Accordingly, in the present exemplary embodiment, the flow rate of the oil O inside the first output side oil passage 31 can be increased promptly while suppressing chattering from occurring. Furthermore, when the valve mechanism 40 is switched from the open state to the closed state, the valve mechanism 40 can be switched to the closed state while suppressing chattering after the flow rate of the oil O inside the first output side oil passage 31 has been promptly reduced.

The second flat portion 43c is a flat portion that connects the first inclination portion 43b and the second inclination portion 43d to each other. The position of the second flat portion 43c in the radial direction does not change in the axial direction. Accordingly, when the input port 41a and the second flat portion 43c opposing each other are relatively moved in the axial direction, the flow rate of the oil O flowing from the input port 41a into the groove 42a does not change. With the above, even in a case in which there is a change in the hydraulic pressure of the oil O inside the first output side oil passage 31 due to an increase in the flow rate of the oil O inside the first output side oil passage 31 caused by the first inclination portion 43b, the hydraulic pressure of the oil O inside the first output side oil passage 31 can be made stable while the input port 41a and the second flat portion 43c relatively move in the axial direction. Accordingly, the flow rate of the oil O inside the first output side oil passage 31 can be increased promptly with the second inclination portion 43d while the hydraulic pressure inside the first output side oil passage 31 is stable. With the above, chattering can be further suppressed from occurring.

A step 43f depressed inward in the radial direction from the outer lateral surface of the valve portion 42 in the radial direction towards the right side is provided in the end portion of the radial-direction-position changing portion 43 on the left side. Accordingly, in a case in which a metal piece or the like is mixed in the oil O that flows into the groove 42a from the input port 41a, the step 43f can prevent the metal piece or the like from being jammed between the outer lateral surface of the valve portion 42 in the radial direction and the inner surface of the spool hole 40a in the radial direction. A size of the step 43f in the radial direction is larger than the size of the metal piece or the like that is mixed in the oil O.

As illustrated in FIGS. 1 and 2, the size of the end portion of the radial-direction-position changing portion 43 on the left side in the circumferential direction becomes larger as the radial-direction-position changing portion 43 extends towards the right side. Accordingly, when the input port 41a and the first inclination portion 43b opposing each other relatively move in the axial direction, the change in the flow rate of the oil O inside the first output side oil passage 31 can be made more gradual. In the present embodiment, the end portion of the radial-direction-position changing portion 43 on the left side is, when viewed from the outside in the radial direction, an arc shape protruded towards the left side. Accordingly, when the input port 41a and the first inclination portion 43b opposing each other relatively move in the axial direction, the change in the flow rate of the oil O inside the first output side oil passage 31 can be made even more gradual. Furthermore, when the radial-direction-position changing portions is made by cutting, the radial-direction-position changing portions 43 can be made easily.

Furthermore, in the present exemplary embodiment, since a plurality of radial-direction-position changing portions 43 are provided in the circumferential direction, the flow rate of the oil O can be suitably changed. Furthermore, since the plurality of radial-direction-position changing portions 43 are disposed in the circumferential direction at equal intervals, the grooves 42a are provided at equal internals in the circumferential direction in the outer lateral surface of the valve portion 42 in the radial direction. With the above, force in the radial direction that is applied from the oil O that flows into the grooves 42a to the spool valve 40b can be easily applied uniformly in the circumferential direction. With the above, the spool valve 40b can be suppressed from being pushed in the radial direction against the inner surface of the spool hole 40a in the radial direction, and the spool valve 40b can be prevented from becoming difficult to slide in the axial direction.

The present disclosure is not limited to the exemplary embodiments described above, and other configurations can be employed. The radial-direction-position changing portions 43 may be provided in the whole circumference of the valve portion 42 in the circumferential direction. In such a case, the grooves 42a are not provided in the outer lateral surface of the valve portion 42 in the radial direction, and the outside diameter of the valve portion 42 in the radial-direction-position changing portion 43 becomes smaller from the left side towards the right side. The manner in which the position of the radial-direction-position changing portion 43 changes in the radial direction is not limited to any manner as long as the position of the radial-direction-position changing portion 43 in the radial direction changes inwardly in the radial direction from the left side towards the right side. The position of the radial-direction-position changing portion 43 in the radial direction may change in a stepwise manner. The radial-direction-position changing portion 43 do not have to have any flat portions. Furthermore, the outer lateral surface of the oil passage constituting portion 44 in the radial direction may be, in the radial direction, positioned at the same position as that of the end portion of the radial-direction-position changing portion 43 on the right side. In such a case as well, it is easy to have the oil O flow from the radial-direction-position changing portion 43 into the connection oil passage 35.

Furthermore, the use application of the hydraulic control and the valve mechanism of the present exemplary embodiments described above is not limited to any use application in particular. Furthermore, each of the configurations described above may be appropriately combined within the range that does not contradict each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spool valve provided in a valve mechanism included in a hydraulic control that includes a first oil supply source that draws in oil and discharges the oil having a first oil flow characteristic, a second oil supply source that draws in the oil and discharges the oil that has a second oil flow characteristic, a first output side oil passage into which the oil discharged from the first oil supply source flows, the first output side oil passage supplying hydraulic pressure to a controlled object, a second output side oil passage into which the oil discharged from the second oil supply source flows, a first connection oil passage that connects the first output side oil passage and the second output side oil passage to each other, and the valve mechanism provided with a spool hole, the valve mechanism being provided in the first connection oil passage, the spool hole including an input port connected to the second output side oil passage and an output port connected to the first output side oil passage, the spool valve provided in the valve mechanism about a central axis that extends in an axial direction being movable inside the spool hole in the axial direction, the spool valve comprising:
 a valve portion that opens and closes a portion between the input port and the output port on a radially inner side surface of the spool hole; and
 a radial-direction-position changing portion provided in an outer lateral surface of the valve portion in a radial direction, the radial-direction-position changing portion including a first inclination portion, a second inclination portion, and a flat portion, wherein
 an axially uppermost end of the second inclination portion is defined by a straight line extending in a circumferential direction perpendicular to the radial direction,
 in a case in which a first value is equivalent to or larger than a threshold, the threshold being larger than 0, the first value being a value obtained by subtracting a value of a first output hydraulic pressure inside a portion of the first output side oil passage to which the first connection oil passage is connected from a value of a second output hydraulic pressure inside a portion of the second output side oil passage to which the first connection oil passage is connected, the portion between the input port and the output port are opened to permit a flow of the oil inside the first connection oil passage from the second output side oil passage to the first output side oil passage, in a case in which the first value is smaller than the threshold, the portion between the input port and the output port is closed to block the flow of the oil inside the first connection oil passage from the second output side oil passage to the first output side oil passage, and the radial-direction-position changing portion extends in the axial direction, and a position thereof in the radial direction changes inwardly from a first side in the axial direction towards a second side in the axial direction.

2. The spool valve according to claim 1, further comprising:

an oil passage constituting portion that is connected to an end portion of the valve portion on the second side in the axial direction, wherein the oil passage constituting portion forms, in the radial direction and together with an inner surface of the spool hole in the radial direction, a connection oil passage that connects the input port and the output port to each other, and wherein an end portion of the radial-direction-position changing portion on the second side in the axial direction is connected to the connection oil passage.

3. The spool valve according to claim 2, wherein an outer lateral surface of the oil passage constituting portion in the radial direction is, in the radial direction, positioned at a same position as a position of the end portion of the radial-direction-position changing portion on the second side in the axial direction, or is positioned on an inner side in the radial direction with respect to the end portion of the radial-direction-position changing portion on the second side in the axial direction.

4. The spool valve according to claim 1, wherein the first inclination portion inclines towards an inner side in the radial direction from the first side in the axial direction towards the second side in the axial direction.

5. The spool valve according to claim 4, wherein the second inclination portion is disposed on the second side in the axial direction with respect to the first inclination portion, the second inclination portion inclines towards the inner side in the radial direction from the first side in the axial direction towards the second side in the axial direction, and an inclination of the second inclination portion against the axial direction is larger than an inclination of the first inclination portion against the axial direction.

6. The spool valve according to claim 5, wherein the flat portion is parallel to the axial direction, and the flat portion connects the first inclination portion and the second inclination portion to each other.

7. The spool valve according to claim 1, a step that is depressed inwardly in the radial direction is provided in an end portion of the radial-direction-position changing portion on the first side in the axial direction from an outer surface of the valve portion in the radial direction towards the second side in the axial direction.

8. The spool valve according to claim 1, wherein the radial-direction-position changing portion is provided in a plural number in a circumferential direction.

9. The spool valve according to claim 8, wherein the plurality of radial-direction-position changing portions are disposed in the circumferential direction at equal intervals.

10. The spool valve according to claim 1, wherein a circumferential size of an end portion of the radial-direction-position changing portion on the first side in the axial direction becomes larger towards the second side in the axial direction.

11. The spool valve according to claim 10, wherein the first side of the radial-direction-position changing portion in the axial direction has an arc shape that protrudes towards the first side in the axial direction when viewed from an outside in the radial direction.

12. The spool valve according to claim 11, wherein the radial-direction-position changing portion extends in a straight line in the axial direction.

* * * * *